United States Patent [19]

Koci

[11] Patent Number: 5,104,415
[45] Date of Patent: Apr. 14, 1992

[54] AQUEOUS DYE FORMATIONS: WATER INSOLUBLE DYE AND ETHOXYLATED SULFATED ALKYL-PHENOL OR FATTY ALCOHOL IN WATER

[75] Inventor: Zdenek Koci, Binningen, Switzerland

[73] Assignee: Ciba-Geigy Corporation, Ardsley, N.Y.

[21] Appl. No.: 612,750

[22] Filed: Nov. 13, 1990

[30] Foreign Application Priority Data

Nov. 16, 1989 [CH] Switzerland .................. 4118/89

[51] Int. Cl.$^5$ .................. C09B 67/42; B01F 17/00
[52] U.S. Cl. .................. 8/527; 8/557; 8/589; 8/591; 8/922
[58] Field of Search .................. 8/527

[56] References Cited

U.S. PATENT DOCUMENTS

| | | | |
|---|---|---|---|
| 4,101,273 | 7/1978 | Matsuba et al. | 8/555 |
| 4,187,192 | 2/1980 | Sheridan | 252/313 |
| 4,655,786 | 4/1987 | Navratil | 8/475 |
| 4,702,743 | 10/1987 | O'Callaghan | 8/527 |
| 4,914,246 | 4/1990 | Oswald | 568/793 |
| 4,923,481 | 5/1990 | Galli et al. | 8/589 |

FOREIGN PATENT DOCUMENTS 2090876 7/1982 United Kingdom .

Primary Examiner—A. Lionel Clingman
Attorney, Agent, or Firm—Marla J. Mathias; Edward McC. Roberts

[57] ABSTRACT

Aqueous dye formations which comprise:

a) at least one water-insoluble or sparingly water-soluble dye,
b) at least one sulfated polyadduct of an alkylphenol containing 2 to 12 carbon atoms in the alkyl moiety with at least 20 mol of ethylene oxide or a sulfated polyadduct of a fatty alcohol with at least 20 mol of ethylene oxide, and, as additional optional components, c) a betain monohydrate, and
d) an anionic dispersant of the general formula I

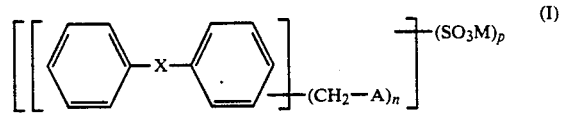

wherein
X is a direct bond or oxygen,
A is hydrogen or the radical of an aromatic compound which is attached through a ring carbon atom to the methylene group,
n and p are each independently of the other a value from 1 to 4, and
M is a monovalent cation, and/or condensates of these compounds with formaldehyde, as well as
e) further optional auxiliaries and
f) water.

Such formulations have very good storage stability in the temperature range from −10° C. to +50° C. and, in particular, have very good redispersibility after drying in the air. For printing synthetic textile materials it is also very readily possible to use synthetic thickeners to give spot-free prints.

19 Claims, No Drawings

AQUEOUS DYE FORMATIONS: WATER INSOLUBLE DYE AND ETHOXYLATED SULFATED ALKYL-PHENOL OR FATTY ALCOHOL IN WATER

The present invention relates to aqueous dye formulations, process for their preparation and to the use thereof for dyeing, especially for printing, synthetic textile materials using synthetic thickeners, or for transfer printing, preferably on paper, using synthetic thickeners.

Alongside the known natural thickeners or semi-emulsion thickeners for which chiefly white spirit is used, synthetic thickeners such as the high molecular weight polyacrylic acids having a molecular weight higher than one million have gained acceptance for printing synthetic textile materials such as polyester, polyamid or polyacrylnitrile for economic and environmental reasons over the past 10 to 15 years. However, for printing synthetic textile materials and paper using different high molecular weight mono- or copolymeric polycarboxylic acids it has not been possible to use the bulk of disperse dyes, because the content of organic and inorganic electrolytes in commercial powder and liquid formulations of these dyes containing anionic dispersants, such as naphthalenesulfonic acid/formaldehyde condensates, ligninsulfonates, sulfated oils, condensates of cresol, formalin and naphthalenesulfonic acid, causes strong liquefaction of the synthetic thickeners, so that these formulations cannot be applied from print pastes containing them.

It has further been found that dye formulations containing nonionic dispersants and other neutral components are best suited to synthetic thickeners, because they cause no or only minimum liquefaction of the print paste and can be very easily applied from print pastes containing them. The drawback of such liquid dye formulations containing nonionic dispersants is, however, that they are very poorly redispersible. After relatively short storage they dry out rapidly on the walls of the container to form an agglomeration of the dye dispersion. Such dye formulations, when applied, then give unlevel spotty prints. This poor redispersibility of nonionic dye formulations cannot be, or can only insignificantly be, improved by adding optimum hygroscopic humectants such as ethylene glycol, propylene glycol, glycerol or sorbitol alcohol even in increased amounts to the dye formulation.

For these reasons, it has been proposed to use dye formulations which, in addition to containing a nonionic dispersant, also contain a customary anionic dispersant.

But even these dye formulations have only a minimally enhanced redispersibility and, on account of the amount and nature of the anionic dispersant or its possible contamination with residual inorganic salts from the synthesis, such formulations often cause strong liquefaction of the synthetic thickener, resulting in less level, blurred prints.

In EP-A 56 523 it has therefore been proposed to use sulfated or phosphated polyadducts of non-alkylated aromatic compounds (phenols) with ethylene oxide for the preparation of dye formulations having enhanced properties for application with synthetic and natural thickeners. In this patent, sulfated polyadducts of 4-nonylphenol with 4 to 14 mol of ethylene oxide were used for comparison purposes in Example 49 (Table 4) and found to be unsuitable on account of the poor redispersibility of such formulations.

Surprisingly, it has been found that specific dye formulations which contain very weakly anionic higher ethoxylated and sulfated alkylphenols or fatty alcohols overcome all the disadvantages referred to above and, in particular, have in addition to an only minimum liquefying effect on the synthetic thickener an unexpectedly very good redispersibility and hence give good results in printing without formation of spots.

Accordingly, the present invention relates to aqueous dye formulations which comprise:
a) at least one water-insoluble or sparingly water-soluble dye,
b) a sulfated polyaduct of an alkylphenol containing 2 to 12 carbon atoms in the alkyl moiety with at least 20 mol of ethylene oxide or a sulfated polyadduct of a fatty alcohol with at least 20 mol of ethylene oxide, and, as additional optional components,
c) a betain monohydrate, and
d) an anionic dispersant of the general formula I

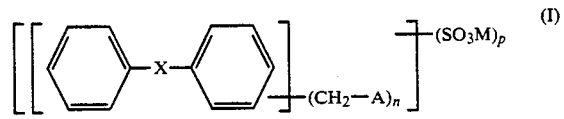

wherein
X is a direct bond or oxygen,
A is hydrogen or the radical of an aromatic compound which is attached through a ring carbon atom to the methylene group,
n and p are each independently of the other a value from 1 to 4, and
M is a monovalent cation, and/or condensates of these compounds with formaldehyde, as well as
e) additional optional auxiliaries and
f) water.

The water-insoluble or sparingly water-soluble dye used as component a) is preferably a dye which has a solubility in water of less than 1 g/l at a temperature of 20° C. and belongs to chemically widely differing classes. Such a dye is typically a nitro, aminoketone, ketoneimine, methine, polymethine, diphenylamine, quinoline, benzimidazole, xanthene, oxazine or coumarin dye which does not contain carboxylic acid and/or sulfonic acid groups, and, more particularly, an anthraquinone or azo dye such as a mono- or disazo dye. Preferred dyes are disperse dyes which are listed, for example, in the Colour Index under "Disperse Dyes". The term "disperse dyes" will also be understood as comprising the use of other water-insoluble dyes such as pigment dyes or solvent dyes, provided they give a good, level and fast dyeing comparable to that obtained with the disperse dyes in the different processes for printing and dyeing synthetic materials. Suitable in this connection are in particular the low molecular organic pigment dyes or selected solvent dyes. The pigment and solvent dyes are listed, for example, in the Colour Index under "Pigment Dyes" and "Solvent Dyes".

Dyes suitable for transfer printing can also be used. These are preferably water-insoluble or sparingly water-soluble dyes, preferably disperse dyes, which vapourise to at least 60% at atmospheric pressure in the temperature range from 150° to 220° C. in less than 60 seconds and which can be transferred without decomposition and remaining heat-stable. Preferred dye formulations contain the water-insoluble or sparingly water-soluble dye in an amount of 15 to 45% by weight, preferably 25 to 35% by weight, based on the dye formulation.

Eligible sulfated polyadducts of an alkylphenol or a fatty alcohol with ethylene oxide suitable for use as component b) are polyadducts with more than 20 mol, preferably 20 to 100 mol, of ethylene oxide. Suitable alkylphenols are those which contain 2 to 12, preferably 8 to 12, carbon atoms in the alkyl moiety. A sulfated polyadduct of 4-nonylphenol with 35 mol of ethylene oxide and a sulfated polyadduct of isooctylphenol with 25 mol of ethylene oxide are especially preferred. The sulfated polyadducts of fatty alcohols with ethylene oxide are those which contain 6 to 22 carbon atoms such as tauryl alcohol, oleyl alcohol, stearyl alcohol and cetyl alcohol. Particlarly good results are obtained with a sulfated polyadduct of tallow fatty alcohol with 32 or 60 or 77 mol of ethylene oxide. On account of the the high degree of ethoxylation and, allied thereto, the relatively high molecular weight, these sulfated polyadducts are very weakly anionic and contain only very minimal amounts of sodium ions (generally less than 2% of Na⊕). The content of component b) in the dye formulation is preferably 1 to 10% by weight, most preferably 4 to 6% by weight, based on the dye formulation.

As optional component c) the dye formulations of this invention may contain 0 to 10% by weight, preferably 3 to 8% by weight, of betain monohydrate, based on the dye formulation.

As further optional component d) the dye formulations of this invention may contain an anionic dispersant of the general formula I

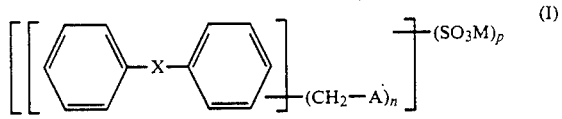

wherein X is a direct bond or oxygen, A is hydrogen or the radical of an aromatic compound which is attached through a ring carbon atom to the methylene group, n and p are each independently of the other a value from 1 to 4, and M is a monovalent cation, and/or condensates of these compounds with formaldehyde.

The radical A is preferably the radical of an aromatic compound and, most preferably, the naphthalene radical, and M is preferably Na, K, Li, triethanolamine and triisopropanolamine.

Normally the values for n and p are whole numbers. But they may also be any fraction from 1 to 4, for example 1.4-1.8-2.1 or 3.2. Preferably n and p are each independently of the other 1 or 2.

If A in the compound of formula I is hydrogen, said compound is preferably a sulfonated bistolyl ether.

It is preferred to use an anionic dispersant of formula IA

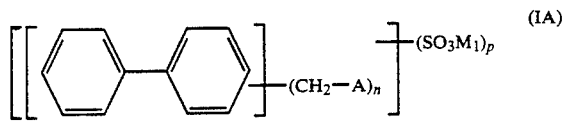

wherein

A is the radical of an aromatic compound which is attached through a ring carbon atom to the methylene group, $M_1$ is sodium, potassium, lithium, triethanolamine or triisopropanolamine, and n and p are each independently of the other a value from 1 to 4, and, more particularly, an anionic dispersant of formula (IB)

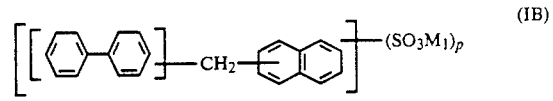

wherein $M_1$ is sodium, potassium, lithium, triethanolamine or triisopropanolamine.

These anionic dispersants of formula I are conveniently prepared by reacting an aromatic compound which contains at least two replaceable hydrogen atoms in the aromatic nucleus with a compound of the general formula II

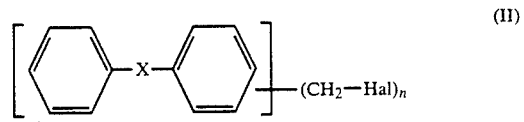

wherein

X is a direct bond or oxygen,

Hal is chloro or bromo, and n is a value from 1 to 4, and sulfonating the condensate. Condensates of the indicated kind may also be prepared by reacting a sulfonated aromatic compound which contains at least two replaceable hydrogen atoms in the aromatic nucleus with a compound of formula II.

The aromatic compounds used as starting materials and which contain at least two replaceable hydrogen atoms in the aromatic nucleus may be mononuclear or polynuclear, preferably binuclear, aromatic hydrocarbons which may be substituted. Suitable substituents are, typically, alkyl groups of 1 to 4 carbon atoms, alkoxy groups of 1 to 4 carbon atoms, or halogens such as chloro. Naphthalene compounds which may be substituted by chloro or methyl are preferred. Typical examples of mononuclear and polynuclear aromatic compounds are: alkylbenzenes such as toluene, xylenes, isopropylbenzene, isobutylbenzene, tert-butylbenzene, alkoxybenzenes such as anisoles, phenetols, butoxybenzene, and also diphenylalkanes, tetrahydronaphthalene, naphthalene, alkylnaphthalenes such as α- and β-methylnaphthalene, as well as acenaphthene, anthracene, perylene, pyrene and dihydrophenanthrene.

Naphthalene or naphthalenesulfonic acids are very suitable. It is, of course, also possible to use mixtures of these mono- or polynuclear aromatic compounds as starting materials.

The compounds of formula II also used as starting materials are prepared, for example, by reacting diphenyl or diphenyl ether with formaldehyde and a hydrogen halide such as hydrogen chloride or hydrogen bromide in accordance with the methods described in U.S. Pat. No. 3,004,072 or IT-A-600 124.

Preferred starting materials of formula II are chloromethyl diphenyl and chloromethyl diphenyl ether. These compounds are normally mixtures of isomers containing 1 to 3 chloromethyl groups, which chloromethyl groups, for example, are preferably in o- or p-position of both benzene rings. Accordingly, the corresponding sulfonated condensates are also normally mixtures, especially of mono- to trisubstituted diphenyl or diphenyl ether products. Depending on the starting materials and the chosen reaction conditions of the preparation of the condensates, the ratio of the isomers to each other will change.

The sulfonated condensates are disclosed in DE-A-235 691.

The eligible anionic dispersant preferably has a ratio of carbon to organically bound sulfur of >15:1. The anionic dispersant will preferably be used in a low salt content form, which means that the amount of electrolyte in the dry dispersant, expressed as $Na_2SO_4$, is less than 1% by weight.

The reverse osmosis membranes preferably used for deionising the anionic dispersant consist essentially of an organic polymer which is modified at least at the surface by radicals which contain ionic groups. In this manner it is possible to process modified natural, regenerated or synthetic polymers to membranes. Such a polymeric material to be modified typically contains hydroxyl groups, halogen atoms, haloalkyl, amino and-/or amidoxime groups as reactive atoms or groups. It can then be reacted with suitable compounds which, on the one hand, contain ionic groups and, on the other, at least one reactive group, to form a chemical (covalent) bond.

Exemplary of polymeric compounds which can be modified in the indicated manner are:
cellulose acetates, for example those having a low content of acetyl groups, but also higher acylated cellulose such as secondary acetate,
polyvinyl alcohols,
polyacrylonitrile or copolymers of acrylonitrile and other ethylenically unsaturated monomers,
polysulfones,
polystyrenes,
polyamides or
polyimides.

Such membranes are known, for example, from U.S. Pat. Nos. 4,604,204, 4,584,103, 4,753,725, 4,690,766, 4,477,634 and 4,720,345.

The membranes may have different shapes and are, for example, disc-shaped, lamellar, tube-shaped, in bag form, conical or in the form of hollow fibres. To be able to use them effectively for the separation of substances, they have to be integrated into appropriate systems (modules) and incorporated into units (for pressure permeation).

The above described membranes used for the separation and/or purification of the starting solutions or suspensions by the principle of ultrafiltration are essentially those which have a cut-off level in the molecular weight range from 300 to 800, preferably from 400 to 500, and which are symmetrical or, preferably, asymmetrical. Water and dissolved substances, which on account of their molecular weight are below the cut-off level, pass through these membranes readily by applying low to medium pressure. Pressures of 10 to 100 bar, preferably of 10 to 30 bar, are applied in the process of this invention. The pressure may be applied by means of a pump. When carrying out the process of the invention, the pH and temperature can vary within wide ranges, depending on the membranes employed.

The dye formulations of this invention contain the anionic dispersant in an amount of 0 to 4% by weight, preferably of 1 to 2% by weight, based on the dye formulation.

The dye formulations of this invention may additionally contain auxiliaries as further components in a total amount of ca. 10 to 40% by weight, based on the dye formulation. Specifically, these auxiliaries are preferably and typically:

antifoams in an amount of 0.1 to 1.0% by weight, based on the dye formulation, preferably a solution of 2,4,7,9-tetramethyl-5-decyn-4,7-diol in ethylene glycol;

preservatives in an amount of 0.2 to 0.3% by weight, based on the dye formulation, for example chloroacetamide or hydroxymethyl chloroacetamide;

thickeners in an amount of 0.1 to 1.0% by weight, based on the dye formulation, for example hydroxyethyl cellulose, polyvinyl alcohol or sodium polystyrenesulfonate;

antifreeze agents in an amount of 10 to 35% by weight, based on the dye formulation, for example ethylene glycol, propylene glycol, glycerol, sorbitol alcohol, diethylene glycol, triethylene glycol, tetraethylene glycol, dipropylene glycol, diglycerol and polyglycerols.

The dye formulations of this invention are distinguished, in particular, by their storage stability over several months in the temperature range from $-10°$ C. to $+50°$ C. and, more particularly, by their very good redispersibility, even after drying in the air. Compared with similar non-sulfated, i.e. nonionic, ethoxylated compounds which have a poor redispersibility, this feature is surprising and was not to be predicted.

Especially useful dye formulations contain:
a) 15 to 45% by weight of at least one disperse dye, based on the dye formulation,
b) 1 to 10% by weight, based on the dye formulation, of the sulfated polyadduct of 4-nonylphenol with 35 mol of ethylene oxide or of isooctylphenol with 25 mol of ethylene oxide,
c) 0 to 10% by weight of betain monohydrate,
d) 0 to 4% by weight of the anionic dispersant of the general formula (IB)

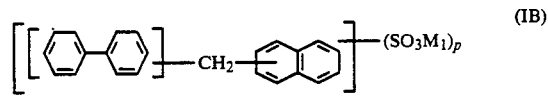

wherein
$M_1$ is sodium, potassium, lithium, triethanolamine or triisopropanolamine, and
p is a value from 1 bis 4,
e) 0.1 to 1.0% by weight of antifoam, and/or 0.2 to 0.3% by weight of preservative and/or 0.1 to 1.0% by weight of thickner, and/or 10 to 35% by weight of anti-freeze agent, as well as
f) water; or
a) 15 to 45% by weight of at least one disperse dye, based on the dye formulation,
b) 1 to 10% by weight, based on the dye formulation, of the sulfated polyadduct of tallow fatty alcohol with 32 or 60 or 77 mol of ethylene oxide,
c) 0 to 10% by weight of betain monohydrate,
d) 0% by weight of the anionic dispersant,
e) 0.1 to 1.0% by weight of antifoam, and/or 0.2 to 0.3% by weight of perservative and/or 0.1 to 1.0% by weight of thickner, and/or 10 to 35% by weight of anti-freeze agent, as well as f) water.

The aqueous dye formulations of the invention are prepared by milling the water-insoluble or sparingly water-soluble dye in water, with the addition of the anionic compound used as component b) and with the further optional addition of the anionic dispersant used as component d), to a particle size of less than 10μ, the remaining components being added before, during or after the milling operation.

The conventional colloid mills, vibrating mills and ball mills, pin mills, vibromixers, dissolvers and submicron dispersers can be used as high-performance dispersing mixers for the wet milling. It is preferred, however, to use microsol mills or continuous stirred mills with grinding elements, preferably those of silica having a diameter of 0.2-5 mm, so-called glass bead mills or sand mills. The dispersion is milled until the dye particles are smaller than 10μ especially smaller than 2μ. The dispersion is then separated from the grinding elements.

The aqueous dye formulations of this invention also find utility in particular for the preparation of dye liquors or print pastes for dyeing or printing synthetic textile materials as well as for printing supports for transfer printing.

The preferred utility, however, is for printing textile materials, preferably polyester materials, in the presence of synthetic thickeners. Synthetic thickeners are primarily high molecular weight polyacrylic acids, particularly those having a molecular weight of 1 to $10 \cdot 10^6$, preferably 3 to $10 \cdot 10^6$ and, most preferably, 3 to $6 \cdot 10^6$. The preferred synthetic thickener is polyacrylic acid crosslinked with divinylbenzene (molecular weight ca. $4 \cdot 10^6$). Further suitable synthetic thickeners are high molecular weight copolymeric ethylene-maleic acids or styrene-acrylic acids.

Textile materials can, however, also be printed in the presence of natural thickeners such as plant seed gum derivatives or alginates or with a semi-emulsion thickener (for example alginate/white spirit emulsion). Also suitable are print pastes which contain a mixture of synthetic and natural thickeners.

The dye formulations of this invention are also suitable for dyeing synthetic textile materials, especially polyester, in different continuous dyeing processes, for example for dyeing polyester materials by the thermosol pad process, or for dyeing polyester/cellulosic fibres by one-bath and two-bath processes, as well as for dyeing polyester or polyester/cellulosic fibres by the HT exhaust process, with the addition of anionic dispersants such as ligninsulfonates, condensates of phenols, naphtholsulfonic acids, sodium sulfite and formaldehyde.

A further utility of the dye formulations of this invention is for transfer printing if disperse dyes suitable for transfer printing are used.

Transfer printing is carried out in conventional manner using a transfer press. This is done by contacting the substrate to be printed with the printed support in the temperature range from ca. 150°-220° C. until the dyes on the support have transferred to the substrate. Normally 5 to 60 seconds suffice for the transfer. The printed material is separated from the support, and an aftertreatment is normally not necessary. The supports are primarily the known papers suitable for transfer printing having a weight of 60 to 80 g/m², but also cellophane or metal foils. Suitable substrates for transfer printing are preferably textile materials, preferably flat goods such as nonwovens, felts, carpets and, more particularly, wovens and knits made from synthetic fibres, especially polyester fibre materials. Transfer printing can, of course, also be carried out using suitable supports for printing or decorating other materials such as suitably pretreated tin cans.

Spot-free dyeings and prints of good allround fastness properties are obtained in all these different utilities.

The invention is illustrated by the following non-limitative Examples in which parts and percentages are by weight.

The individual tests are carried out as follows:

Storage Stability Test

The liquid formulation is stored in a sealed flask for 14 days at +40° C. or +50° C. and −10° C. Then 3 g of the formulation are stirred in 200 ml of deionised water at 750 rpm for 2 minutes with a magnetic stirrer, filtered through a SS 1450 CV round filter, and washed with 50 ml of deionised water. For good storage stability, no filter residue should be present on the paper filter.

Redispersibility test 1.5 g of the liquid dye formulation are put into a 400 ml glass beaker to form a thin layer on the bottom of the beaker. After open storage for 1, 3 and 7 days, the dry residue is diluted with 100 ml of deionised water, stirred for 2 minutes at 750 rpm with a magnetic stirrer, filtered through the SS 1450 CV φ 7 cm round filter, and washed with 50 ml of deionised water. For good redispersibility, no or only an insignificant filter residue should be present on the paper filter.

Those formulations which cause precipitation of the dispersion even after 1 day in the redispersibility test will have poor redispersibility, resulting in spotty prints. Dye formulations which are readily redispersible after, for example, 7 days in the redispersibility test without precipitation give very good spot-free prints.

EXAMPLE 1

55 Parts of the dry disperse dye, Disperse Yellow 88, are added slowly, with efficient stirring, to a solution of
12 parts of a 75% aqueous solution of an anionic compound, the sodium salt of the sulfated polyadduct of 4-nonylphenol with 35 mol of ethylene oxide,
12 parts of betain monohydrate,
0.6 part of hydroxymethyl chloroacetamide,
0.8 part of a solution of 2,4,7,9-tetramethyl-5-decyn-4,7-diol in ethylene glycol,
60 parts of a 70% solution of sorbitol, and
59.6 parts of water,
and the mixture is homogenised for ca. 20 minutes at room temperature.

The resultant dye suspension is then milled for 7 hours in an open mill with 200 parts of silicone quartz beads (φ 2 mm) to an average dye particle size of ca. 1μ. The grinding media are then separated to give a liquid dye formulation which has very good storage stability over 1 month at −10° C., and +40° C., and +50° C., is very readily redispersible even after 7 days, and, when printed on PES material with a synthetic thickener based on high molecular weight polyacrylic acid, gives a spot-free level print of good allround fastness properties after fixing the print in a HT steamer for 8 minutes at 180° C. and washing off the print so obtained.

If the sodium salt of the sulfated polyadduct of 4-nonylphenol with 35 mol of ethylene oxide is replaced by a corresponding nonionic polyadduct of 4-nonylphenol with 35 mol of ethylene oxide, then a formulation is obtained which has very poor redispersibility even after 1 day and, after storage for 1 month at +40° C., gives a spotty print when applied to polyester in the same manner.

EXAMPLE 2

59 Parts of the dry disperse dye of formula

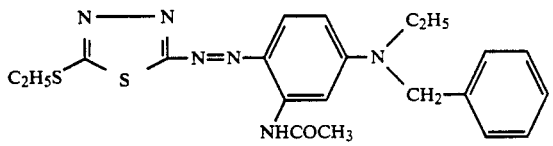

are slowly added, with efficient stirring, to a solution of
34.3 parts of a 34% aqueous solution of the sodium salt of the sulfated polyadduct of isooctylphenol with 25 mol of ethylene oxide,
14 parts of betain monohydrate,
15 parts of a 33% aqueous solution of the condensate of biphenylmethyl/naphthalenesulfonic acid (prepared according to Example 3 of German Offenlegungsschrift 2 352 691 and purified and deionised to a content of 0.5% of $Na_2SO_4$ in the dried product by reverse osmosis in a unit with the modified polyacrylonitrile membrane described in Example 1 of German Offenlegungsschrift 3 035 135 and having a molecular weight cut-off level of ca. 500),
0.8 part of a solution of 2,4,7,9-tetramethyl-5-decyn-4,7-diol in ethylene glycol,
0.6 part of chloroacetamide,
65 parts of a 70% solution of sorbitol, and
11.3 parts of water,
and the mixture is homogenised for ca. 20 minutes at room temperature.

The resultant dye suspension is then milled for 24 hours in an open mill with 200 parts of silicone quartz beads ($\phi$ 2 mm) to an average dye particle size of ca. 1$\mu$. The grinding media are then separated to give a liquid dye formulation which has good storage stability over 2 months at −10° C., +40° C. and +50° C., and which is very readily redispersible in the 7 day redispersibility test.

A level print of good allround fastness properties is obtained on PES material when this formulation is applied as described in Example 1.

EXAMPLE 3

64.4 Parts of the dry disperse dye of formula

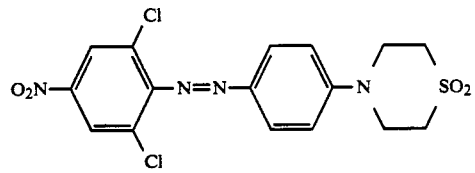

are slowly added, with stirring, to a solution of
30 parts of a 30% aqueous solution of the sodium salt of the sulfated polyadduct of tallow fatty alcohol with 32 mol of ethylene oxide,
12 parts of betain monohydrate,
1 part of a solution of 2,4,7,9-tetramethyl-5-decyn-4,7-diol in ethylene glycol, 0.6 part of hydroxymethyl chloroacetamide,
60 parts of a 70% solution of sorbitol, and
32 parts of water,
and the mixture is homogenised for 20 minutes at room temperature.

The resultant dye suspension is then milled for 7 hours in an open mill with 200 parts of silicone quartz beads ($\phi$ 2 mm) to an average dye particle size of ca. 1$\mu$. The grinding media are then separated to give a liquid dye formulation which has good storage stability over 1 month at −10° C., +40° C. and +50° C., and which is very readily redispersible in the 7 day redispersibility test.

A level spot-free print of good fastness properties is obtained when this formulation is printed on PES material with a natural alginate-based thickener after fixing the print in a HT steamer for 8 minutes at 175° C. and washing off the print so obtained.

If the sodium salt of the sulfated polyadduct of tallow fatty alcohol with 32 mol of ethylene oxide is replaced with an equal amount of the sodium salt of the sulfated polyadduct of tallow fatty alcohol with 60 or 77 mol of ethylene oxide, then a formulation is obtained having comparably good properties such as storage stability, redispersibility and application properties.

If the sodium salt of the sulfated polyadduct of tallow fatty alcohol with 32 mol of ethylene oxide is replaced by a non-sulfaminated product such as the polyadduct of stearyl alcohol with 30 mol of ethylene oxide, then a formulation is obtained which causes dense precipitation (agglomeration) after only 1 day of the redispersibility test and, after storage for 1 month at +40° C. and when applied in the same manner, gives a spotty print.

EXAMPLE 4

98.1 Parts of a moist press cake of the disperse dye of Example 1 of DE-A-2 850 482 are added, with stirring, to a solution of
32.0 parts of a 34% aqueous solution of the sodium salt of the sulfated polyadduct of isooctylphenol with 25 mol of ethylene oxide,
14 parts of betain monohydrate,
0.8 part of a solution of 2,4,7,9-tetramethyl-5-decyn-4,7-diol in ethylene glycol,
0.6 part of chloroacetamide,
46 parts of glycerol, and
8.5 parts of water
and the mixture is homogenised for ca. 20 minutes at room temperature.

The resultant dye suspension is then milled for 8 hours in an open mill with 200 parts of silicone quartz beads ($\phi$ 2 mm) to an average dye particle size of ca. 1$\mu$. The grinding media are then separated to give a liquid dye formulation which has good storage stability over 1 month at −10° C., +40° C. and +50° C., and which is very readily redispersible even after 7 days.

The formulation is applied with a synthetic thickener based on high molecular weight polyacrylic acid to transfer printing paper. PES fabric is then contacted with the printed paper for 30 seconds at 210° C. in a transfer printing press to give a level, spot-free blue print of good fastness properties.

EXAMPLE 5

65.8 Parts of the dry disperse dye according to Example 6 of EP-A-79 862 are slowly added, with efficient stirring, to a solution of 12.0 parts of a 75% aqueous solution of an anionic compound, the sodium salt of the sulfated polyadduct of 4-nonylphenol with 35 mol of ethylene oxide,
12 parts of betain monohydrate,
0.6 part of a 50% solution of 2,4,7,9-tetramethyl-5-decyn-4,7-diol in ethylene glycol,
0.6 part of chloroacetamide,
40 parts of glycerol, and
69 parts of water,
and the mixture is homogenised for ca. 20 minutes at room temperature.

The resultant dye suspension is then milled for 20 hours in an open mill with 200 parts of silicone quartz beads (ϕ 2 mm) to an average dye particle size of ca. 1μ. The grinding media are then separated to give a liquid dye formulation which has very good storage stability over 1 month at −10° C., +40° C. and +50° C., and which is very readily redispersible even after 7 days.

Application of this formulation in the same manner as described in Example 3 gives a level, spot-free print of good fastness properties on PES material.

EXAMPLE 6

57.6 Parts of the dry disperse dye, C.I. Disperse Orange 80, are slowly added, with efficient stirring, to a solution of
30 parts of a 34% aqueous solution of the sodium salt of the sulfated polyadduct of isooctylphenol with 25 mol of ethylene oxide,
20 parts of betain monohydrate,
8 parts of the condensate of biphenylmethyl/naphthalenesulfonic acid in the same quality as Example 2,
0.6 part of hydroxymethyl chloroacetamide,
0.8 part of a solution of 2,4,7,9-tetramethyl-5-decyn-4,7-diol in ethylene glycol,
30 parts of glycerol, and
53 parts of water,
and the mixture is homogenised for ca. 20 minutes at room temperature.

The resultant dye suspension is then milled for 11 hours in an open mill with 200 parts of silicone quartz beads (ϕ 2 mm) to an average dye particle size of ca. 1μ. The grinding media are then separated to give a liquid dye formulation which has good storage stability over 1 month at −10° C., +40° C. and +50° C., and which is very readily redispersible in the 7 day redispersibility test.

Application of this formulation in the same manner as described in Example 1 gives a level print of good all-round fastness properties on PES material.

EXAMPLE 7

96.5 Parts of the moist press cake of the disperse dye, C.I. Disperse Blue 361, are added, with stirring, to a solution of
30 parts of a 34% aqueous solution of the sodium salt of the sulfated polyadduct of isooctylphenol with 25 mol of ethylene oxide,
12 parts of betain monohydrate,
0.8 part of a solution of 2,4,7,9-tetramethyl-5-decyn-4,7-diol in ethylene glycol,
0.6 part of hydroxymethyl chloroacetamide,
40 parts of glycerol,
0.6 part of sodium polystyrenesulfonate (mol. wt. ca. 500 000) thickener, and
19.5 parts of water,
and the mixture is homogenised for ca. 20 minutes at room temperature.

The resultant dye suspension is then milled for 15 hours in an open mill with 200 parts of silicone quartz beads (ϕ 2 mm) to an average dye particle size of ca. 1μ. The grinding media are then separated to give a liquid dye formulation which has good storage stability over 1 month at −10° C., +40° C. and +50° C., and which is very readily redispersible even after 7 days.

Application of this formulation in the same manner as described in Example 1 gives a level print of good all-round fastness properties on PES material.

What is claimed is:

1. An aqueous dye formulation which comprises:
   a) from 15 to 45 percent by weight of a water-insoluble or sparingly water-soluble dye or mixture of dyes,
   b) from 1 to 10 percent by weight of a sulfated polyadduct selected from the adduct of an alkylphenol containing 2 to 12 carbon atoms in the alkyl moiety with at least 20 mol of ethylene oxide or the adduct of a fatty alcohol with at least 20 mol of ethylene oxide,
   c) water,
   d) 0 to 10 percent by weight of a betain monohydrate, and
   e) 0 to 4 percent by weight of an anionic dispersant which is a compound of the formula (I)

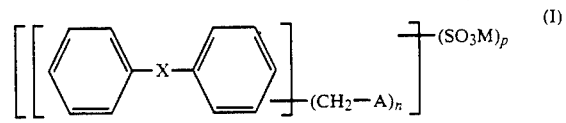

wherein
X is a direct bond or oxygen,
A is hydrogen or the radical of an aromatic compound which is attached through a ring carbon atom to the methylene group,
n and p are each independently of the other a value from 1 to 4, and
M is a monovalent cation,
or the anionic dispersant is a condensate of a compound of formula (I) with formaldehyde.

2. An aqueous dye formulation according to claim 1, wherein the water-insoluble or sparingly water-soluble dye is a disperse dye.

3. An aqueous dye formulation according to claim 1, which contains the water-insoluble or sparingly water-soluble dye in an amount of 25 to 35% by weight, based on said dye formulation.

4. An aqueous dye formulation according to claim 1, which contains the polyadduct b) in an amount of 4 to 6% by weight, based on said dye formulation.

5. An aqueous dye formulation according to claim 1, wherein component b) is a sulfated polyadduct of 4-nonylphenol with 35 mol of ethylene oxide or a sulfated polyadduct of isooctylphenol with 25 mol of ethylene oxide.

6. An aqueous dye formulation according to claim 1, wherein component b) is a sulfated polyadduct of tallow fatty alcohol with 32 or 60 or 77 mol of ethylene oxide.

7. An aqueous dye formulation according to claim 1, which contains the betain monohydrate component d) in an amount of 3 to 8% by weight, based on said dye formulation.

8. An aqueous dye formulation according to claim 1, wherein the anionic dispersant used as component e) has the general formula (IA)

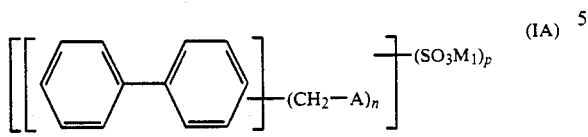

wherein
- A is the radical of an aromatic compound which is attached through a ring carbon atom to the methylene group,
- $M_1$ is sodium, potassium, lithium, triethanolamine or triisopropanolamine, and
- n and p are each independently of the other a value from 1 to 4.

9. An aqueous dye formation according to claim 8, wherein the anionic dispersant used as component e) has the general formula (IB)

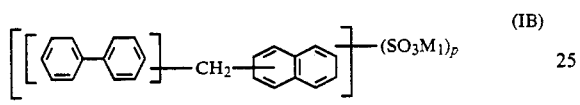

wherein $M_1$ is sodium, potassium, lithium, triethanolamine or triisopropanolamine.

10. An aqueous dye formulation according to claim 1, which contains the anionic dispersant used as component e) in an amount of 1 to 2% by weight, based on said dye formulation.

11. An aqueous dye formulation according to claim 1, wherein the anionic dispersant used as component d) has a ratio of carbon to organically bound sulfur of >15:1, and the amount of electrolyte in the dry dispersant, expressed as $Na_2SO_4$, is less than 1% by weight.

12. An aqueous dye formulation according to claim 1 which further comprises one or more auxiliaries selected from the group consisting of antifoams, preservatives, thickeners and antifreeze agents.

13. An aqueous dye formulation according to claim 1, which comprises:
a) 15 to 45% by weight, based on said dye formulation, of at least one disperse dye,
b) 1 to 10% by weight, based on said dye formulation, of the sulfated polyadduct of 4-nonylphenol with 35 mol of ethylene oxide or of isooctylphenol with 25 mol of ethylene oxide,
c) water,
d) 0 to 10% by weight of a betain monohydrate,
e) 0 to 4% by weight of an anionic dispersant of the general formula (IB)

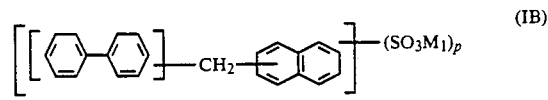

wherein
- $M_1$ is sodium, potassium, lithium, triethanolamine or triisopropanolamine, and
- p is a value from 1 to 4, and optionally,
f) further auxilianes selected from 0.1 to 1.0% by weight of an antifoam, and/or 0.2 to 0.3% by weight of preservative and/or 0.1 to 1.0% by weight of thickener, and/or 10 to 35% by weight of anti-freeze agent.

14. An aqueous dye formulation according to claim 1, which comprises:
a) 15 to 45% by weight, based on said dye formulation, of at least one disperse dye,
b) 1 to 10% by weight, based on said dye formulation, of the sulfated polyadduct of tallow fatty alcohol with 32 or 60 or 77 mol of ethylene oxide,
c) water
d) 0 to 10% by weight of a betain monohydrate,
e) 0% by weight of the anionic dispersant, and optionally, further auxilanes selected from
f) 0.1 to 1.0% by weight of antifoam, and/or 0.2 to 0.3% by weight of preservative and/or 0.1 to 1.0% by weight of thickener, and/or 10 to 35% by weight of anti-freeze agent.

15. A process for the preparation of an aqueous dye formulation according to claim 1, which comprises milling the water-insoluble or sparingly water-soluble dye in water, with the addition of the anionic compound used as component b) and with the further optional addition of the anionic dispersant used as component e), to a particle size of less than 10μ, the remaining components being added before, during or after the milling operation.

16. A method of printing textiles which comprises combining an aqueous dye formulation of claim 1 with a natural or synthetic thickener and applying the resulting paste to the textile.

17. A method of claim 16 wherein the thickener is a synthetic thickener.

18. A method of claim 16 wherein the textile is polyester.

19. A method of claim 17 wherein the thickener is a polyacrylic acid having a molecular weight of from $10^6$ to $10^7$.